United States Patent [19]

Herbert et al.

[11] Patent Number: 4,924,240

[45] Date of Patent: May 8, 1990

[54] FEED FOR THERMAL PRINTING RIBBON

[75] Inventors: Raymond J. Herbert, Leigh-on-Sea; Thomas D. Williams, Billericay, both of United Kingdom

[73] Assignee: Alcatel Business Systems, Limited, Romford, United Kingdom

[21] Appl. No.: 264,832

[22] Filed: Oct. 31, 1988

[30] Foreign Application Priority Data

Nov. 2, 1987 [GB] United Kingdom ................. 8725619

[51] Int. Cl.[5] ......................... G01D 9/00; G01D 15/10

[52] U.S. Cl. ................................ 346/1.1; 346/76 PH; 100/120

[58] Field of Search ............................ 346/76 PU, 1.1; 400/120 PH

[56] References Cited

U.S. PATENT DOCUMENTS 4,746,234 5/1988 Harry ................................. 400/120

FOREIGN PATENT DOCUMENTS 0160267 7/1986 Japan ............................. 346/76 PH

*Primary Examiner*—Bruce A. Reynolds
*Assistant Examiner*—Huan Tran
*Attorney, Agent, or Firm*—Shoemaker and Mattare, Ltd.

[57] ABSTRACT

A thermal transfer printing device for a franking machine uses a multi-strike thermal transfer ribbon. Mail items are fed to the printing device and frictional engagement between the mail item and the ribbon during a printing operation draws ribbon from a supply spool. After completion of the printing operation, the mail item is separated from the ribbon and the ribbon is partially rewound onto the supply spool so that each portion of the ribbon is used progressively a number of times. An encoder disc on the supply spool shaft generates signals indicative of the length of ribbon drawn from and rewound onto the spool to control rewinding of the ribbon.

14 Claims, 2 Drawing Sheets

FEED FOR THERMAL PRINTING RIBBON

BACKGROUND OF THE INVENTION

This invention relates to the feeding of ribbons carrying ink for printing and in particular to the feeding of thermal transfer printing ribbons.

Ribbons are utilised to carry a supply of ink to a printing station at which printing elements cause ink to be transferred from the ribbon to the surface of an article upon which printing is to be effected. In thermal transfer printing processes, the ink is carried in a layer on the surface of a ribbon substrate and the ink is transferred from the ribbon to the surface of the article by the application of heat to the ribbon. With commonly available thermal transfer ribbons, a total transfer of ink occurs at each printing operation so that the ribbon can be used only once. If printing is effected in a serial manner in which the article is moved past the printing elements and the required print impression is built up in a series of printing operations, the ribbon is fed with and at the same speed as the feeding of the article past the printing station. On the other hand if the required impression is printed in a single printing operation in which the article is held stationery at a printing station, the ribbon is also held stationery during the printing operation and is fed during the interval between consecutive printing operations. In each case, the ribbon is fed by approximately the length of print impression for each printing operation. Because the ink corresponding to the pattern of the print impression is totally removed from the ribbon during a print operation the ribbon cannot be re-used because areas of the ribbon from which ink has been totally removed may coincide with areas of the ribbon required for printing a subsequent impression. If such a ribbon was re-used the printing would be defective and unreliable. The ribbon is usually contained on a reel or spool from which it is unwound in use and rewound onto another reel or spool. When the total length of the ribbon has been used, it is necessary to replace the ribbon with a new unused ribbon and this results in an interruption in the use of the printing device. In order to allow a ribbon to be used for a larger number of printing operations multi-strike ribbons are being developed. In one form of these multi-strike ribbons the ink is contained in a plurality of layers. Only a portion of the ink, for example one layer, is removed in the course of a printing operation whereby the length of ribbon may be used a number of times. However while this provides a saving in terms of replacing the ribbon, after each transit of the length of the ribbon past the printing station the ribbon needs to be rewound prior to the next transit of the ribbon. It will be appreciated that because thermal transfer ribbons need to be fed in the same direction as the article on which printing is to be effected, it is not practicable to reverse the direction of feed of the ribbon for each successive transit of the ribbon. Consequently, when the end of the ribbon is reached, subsequent printing operations are delayed by the time taken to rewind the ribbon. A further difficulty arises from the flimsy nature of the ribbon substrate. The substrate tends to become distorted during printing operations and it is difficult to achieve satisfactory rewinding of the ribbon without damage occurring to the substrate of the ribbon.

SUMMARY OF THE INVENTION

According to one aspect of the invention a thermal printing device includes a thermal print head operable to print on a surface of an item by selective application of heat to a thermal transfer ribbon to transfer selected areas of ink from the ribbon to the surface of the item; a thermal transfer ribbon wound upon a supply spool; means operative to feed a length of said ribbon from the supply spool in a first direction between the print head and the item for each printing operation and means including a rewind motor operable during intervals between successive printing operations to drive the supply spool to rewind the ribbon onto the supply spool and thereby to feed the ribbon in a second direction opposite to said first direction by an amount equal to a fraction of said length whereby each part of said ribbon is made available a plurality of times for printing.

According to another aspect of the invention the hereinbefore defined thermal printing device is incorporated in a franking machine for printing franking franking impressions and includes means operable to determine a value of franking; print control means responsive to the value of franking to generate print control signals to control the thermal print head to print a franking impression including said determined value; and accounting means operative to maintain a record of usage of the device for franking printing operations.

According to a further aspect of the invention a franking machine includes a thermal print head operable by print signals; means to guide a thermal transfer inked ribbon past the thermal print head; feeding means to feed a mail item in a first direction past the thermal print head with the thermal transfer ribbon interposed between the mail item and the print head; pressure means actuable to press the mail item toward the print head into engagement with the ribbon, said engagement being effective to feed the ribbon with the mail item in said first direction; rewind means operable to feed the ribbon in a second direction opposite to said first direction; accounting and control means operable to actuate the pressure means and to generate print signals to selectively heat elements of the print head to cause transfer of ink from the ribbon to the mail item to form a franking impression thereon during feeding of the mail item together with a first length of the ribbon past the print head; the accounting and control means being operative to terminate actuation of the pressure means to release the mail item and the ribbon; sensor means operative to generate signals indicative of the length of ribbon fed in said first and second directions; said accounting and control means being responsive to said sensor means to actuate the rewind means after completion of printing the franking impression to feed a second length of the ribbon in the second direction, said second length being a fraction of the first length.

BRIEF DESCRIPTION OF THE DRAWING

An embodiment of the invention will now be described by way of example with reference to the drawings in which:-

DESCRIPTION OF THE PREFERRED EMBODIMENT

Figure 1:
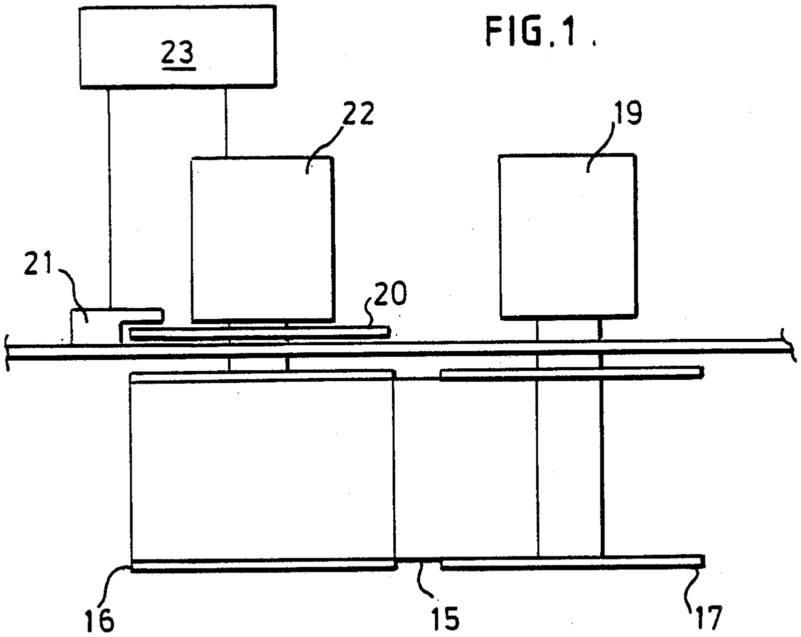
FIG. 1 is a plan view of a printing device incorporating a ribbon feed
Figure 2:
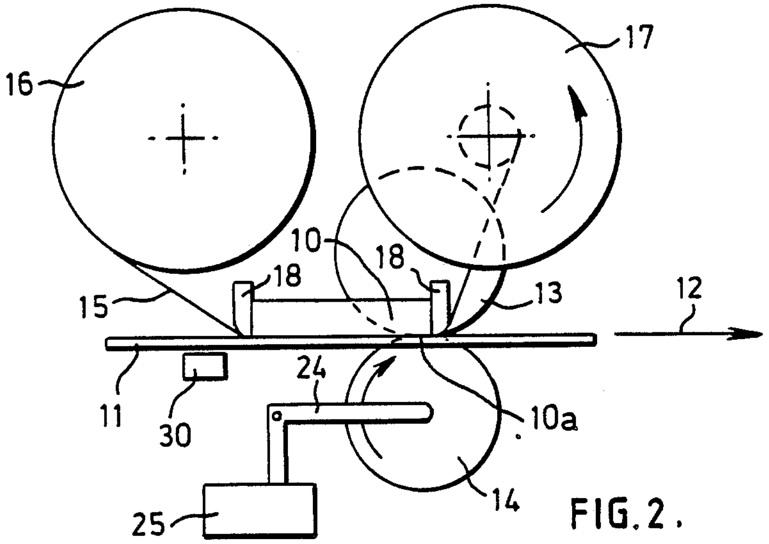
FIG. 2 is a front elevation of the printing device
Figure 3:
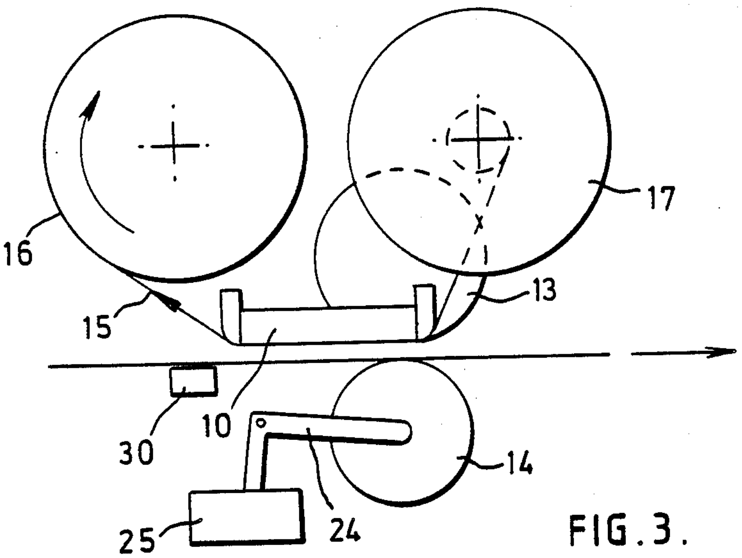
FIG. 3 is a front elevation similar to that shown in FIG. 2 showing the printing device during rewinding of the ribbon.

Referring to the drawings, in particular FIGS. 1 and 2, a printing device has a thermal print head 10 containing a plurality of print elements 10*a* which can be selectively heated by the passage of electric current therethrough. Such thermal print heads are well known and it is believed to be un-necessary to describe the construction and operation thereof. Items 11 upon which printing is to be effected are fed past the print head 10 in the direction of arrow 12 by means of feed rollers 13, of which one is shown in FIGS. 2 and 3, and a co-operating impression roller 14. The feed rollers 13 are positioned on each side of the print head 10 and the impression roller 14 is of greater width than the print head and is urged resiliently toward the print head and the feed rollers. The feed rollers are driven by an electric motor (not shown). The print elements 10*a* in the present embodiment are disposed along a line extending transverse to the direction of feeding aligned substantially with a line along which the impression roller 14 presses toward the head.

A thermal transfer ribbon 15 wound on a rotatable supply spool 16 passes from the spool 16 along the face of the print head 10 and thence to a rotatable take up spool 17. Ribbon guides 18 are provided at each end of the print head. As an item 11 is fed past the print head by the feed rollers 13 and co-operating impression roller 14, the ribbon 15 is pulled, due to frictional contact with the item, from the supply spool 16 so as to be fed between the print head and the item at the same speed as that of the item. Repeated selection and heating of the selected print elements 10*a* results in heating of selected dot areas of the ribbon and transfer of ink from those dot areas to the surface of the item. Thus as the item is fed past the line of print elements dots are printed whereby the required printed characters and patterns are built up serially on the surface of the item. A motor 19 applies a torque to the shaft of the take up spool 17 so as to wind the used ribbon onto the spool 17. The ribbon is a multi-strike ribbon in which only a portion of the ink is removed from areas corresponding to selected printing elements in a single printing operation. Multi-strike ribbons may contain the ink in a plurality of layers. Accordingly the ribbon can be used a number of times until the ink has been reduced to a level at which printing is expected to be unreliable. In order to overcome the disadvantage of needing to rewind and reload the ribbon after each time the full length of ribbon has been unwound from the supply spool the feeding of the ribbon is controlled in such a manner as to result in repeated use of the ribbon during a single passage of the total length of the ribbon from the supply spool to the take up spool.

The impression roller 14 is mounted in such a manner that it may be moved toward and away from the print head and feed rollers 13. For example it may be rotatably mounted on a pair of pivotable arms 24 and an electro-mechanical driver 25, mechanically connected to the arms 24 by suitable drive means, is provided to move the impression roller toward the print head to effect feeding of the item during printing on the item. After printing upon the item has been completed, the electromechanical driver 25 is actuated to move the impression roller 14 away from the print head to allow the item to continue moving in the direction of arrow 12 without drawing further ribbon from the spool 16. This also releases the ribbon from constraint and allows the ribbon to be partially rewound onto the supply spool 16 while also allowing the item 11 to be fed away from the print head in the direction of arrow 12. Alternatively if desired, spring means may be provided to urge the impression roller toward the print head and the electro-mechanical driver is arranged to move the impression roller away from the print head against the action of the spring means. An encoder disc 20 is secured to the shaft of the supply spool 16 and rotates with the supply spool. A sensor 21 responds to rotation of the encoder disc and generates electrical signals indicative of the amount of rotation of the supply spool 16. A rewind motor 22 is coupled to the shaft of the supply spool and is operable to withdraw the ribbon from the take up spool and to rewind it on the supply spool. A microprocessor 23 receives the signals from the sensor 21 and controls the operation of the rewind motor such as to rewind a proportion of the length of ribbon used during the immediately preceding printing operation. This may be accomplished by programming the microprocessor to count electrical pulses from the sensor as the encoder disc rotates during withdrawal of the ribbon from the supply spool and from this count to generate a value equal to a predetermined fraction of the count. During energisation of the rewind motor to rewind the ribbon onto the supply spool, the microprocessor is programmed to count pulses from the sensor and to compare this count with the fraction of count generated during unwinding of the ribbon. When these values are equal, energisation of the rewind motor is terminated.

It will be appreciated that the amount of rotation of the supply spool during a printing operation, assuming the length of the print impression is constant, will increase as the length of ribbon remaining on the spool decreases. The effect of this is that for successive printing operations the count from the sensor increases and similarly the value of the fraction of the count increases in proportion.

In a modification, the positions of the supply and take up spools are interchanged. A short length cf unused ribbon initially is wound onto the take up spool. After printing of each item, during which a length of ribbon is withdrawn from the take up spool, the take up spool is driven by the rewind motor to wind a length of ribbon onto the take up spool which is greater than the length of ribbon withdrawn during printing. Thus in this modification the length of ribbon fed in the interval between printing operations is a fraction, greater than unity, of the length of ribbon fed during each printing operation.

Although the encoder disc is described as being mounted to rotate with the supply spool, if desired, the encoder disc may be mounted on the shaft of the take up spool so as to rotate with the take up spool. Alternatively, the encoder disc need not be coupled to one of the spools but may be coupled to an additional roller contacting the ribbon so as to be rotated by feeding of the ribbon.

Figure 4:
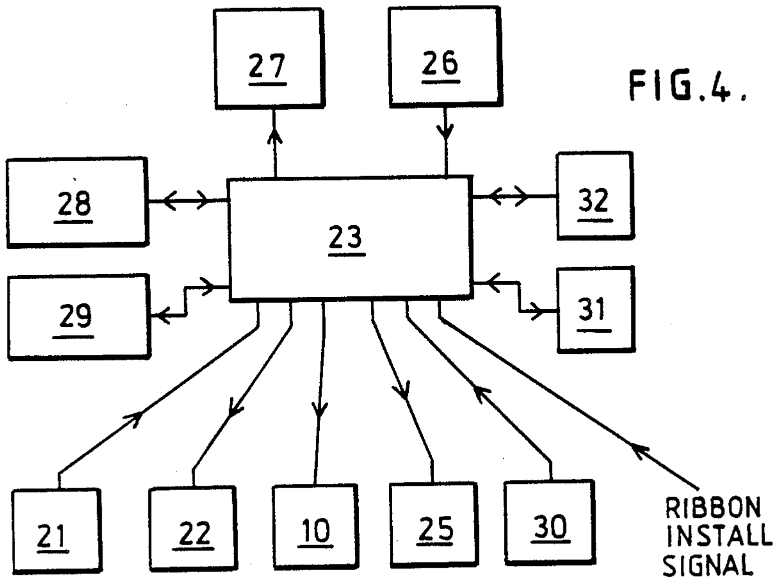
FIG. 4 is a block diagram of the electronic circuitry of a franking machine incorporating the printing device of FIGS. 1 and 2.

Referring now to FIG. 4, the electronic circuitry for the franking machine includes the microprocessor 23, a keyboard 26 for entering data and commands into the microprocessor and a display device 27 for displaying data and instruction information to a user of the machine. The circuitry also includes memories 28 and 29 for storing accounting data relating to the use of the franking machine in franking operations. The data stored in memory 28 is replicated in memory 29 in order to ensure integrity of the stored data. A sensor 30 is mounted, upstream of the drive and pressure rollers 13, 14 (FIG. 2), adjacent the feed path of the items 11 to detect the leading edge of an item 11 being fed to the print head 10. An electrical signal from the sensor 30 indicating detection of an item is input to the microprocessor 23 and in response the microprocessor actuates the electromechanical driver 25 to move the pressure roller toward the feed roller 13 and print head 10. The delays in the system are such that the leading end of the item is between the pressure and feed rollers as the former is moved toward the feed rollers. After a predetermined time period from sensing of the leading edge of the item, the microprocessor outputs print signals to the print elements 10*a* of the print head via print head driver circuits to cause the print elements to effect transfer of ink from the ribbon to the surface of the item as the item together with the ribbon is fed past the print elements. Pulse signals from the sensor 21 resulting from rotation of the reel 16 are input to the microprocessor. During feeding of the ribbon during a printing operation, these pulse signals are accumulated in a register 31 to provide a count representing the length of ribbon used. Upon completion of the printing operation on the item currently being fed past the print head, the microprocessor actuates the electro-mechanical driver to move the pressure roller 14 away from the feed roller 13. The microprocessor reads the count stored in the register 31, calculates a predetermined fraction of the count and then actuates the rewind motor 22 to rewind the ribbon until pulse signals from the sensor 21 during rewinding equal the value of the calculated fraction.

The electrical pulse signals from the sensor 21 may be utilised to initiate an end of ribbon warning. When an unused ribbon is installed in the printing device a register 32 in or connected to the microprocessor 23 is set to store a value representing the amount of rotation of the spool needed to unwind the ribbon to near the end of the ribbon. During manufacture of the ribbon the supply spool will be wound with a substantially uniform number of turns of ribbon. Accordingly the value stored in the register 32 is a constant which may be set automatically by a signal generated upon installation of a ribbon. This signal may be generated by an input on the keyboard by the user of the machine upon installation of a new ribbon or if desired the signal could be generated by means responsive to the installation of a ribbon. Signals from the sensor 21 during unwinding of the ribbon from the supply spool cause the microprocessor to decrement the value in the register 32 whereas signals from the sensor during rewinding of the ribbon cause the value in the register to be incremented. When the value in the register is decremented to a predetermined limit, for example zero, an end of ribbon warning is initiated and this may be displayed to the user on the display device 27.

In the embodiment described hereinbefore, the print head comprises a single line of print elements extending transversely to the direction of feeding of the item 11 and printing is effected serially as the item is moved past the print heads. However if desired the print head may comprise print elements operable at the same time to print the entire impression. With such a print head the item is fed to a printing position confronting the print head and the ribbon is drawn by the feeding of the item to the printing position. The item and ribbon are then held stationery and pressed toward the print head by an impression pad while the printing operation is effected. After the printing operation the impression pad is moved away from the print head to release the item and the ribbon. The item is fed in the direction of arrow 12 away from the printing position and the ribbon is partially rewound as hereinbefore described.

The printing device described hereinbefore is particularly suitable for use in a postal franking machine in which the print head is controlled by the franking meter of the machine to print franking impressions and other information on mail items such as envelopes or labels. While it is preferred to partially rewind the ribbon after printing has been completed on an item, if desired the rewinding may be performed less frequently for example after each second or third item of a series of items. Thus a printing operation may consist of printing on a group of one or more items in succession and the partial rewinding is effected in intervals between printing on groups of items.

We claim:

1. Thermal printing apparatus operable to form print impressions upon successive items in successive printing operations respectively including:

a thermal print head;

means to guide a thermal transfer inked ribbon past the print head from a supply of unused ribbon;

means to feed items upon which printing is to be effected successively to the print head;

pressure means to actuable to press an item being fed into ink transfer engagement with the ribbon, said engagement of the ribbon by the item being effective to feed the ribbon with the item past the print head in a first direction;

control means operable in each of successive printing operations to actuate the pressure means, to generate print signals to operate the print head to transfer ink from the ribbon to an item to form a print impression on said item and after formation of the print impression to terminate actuation of the pressure means to release the ribbon and said item;

operation of the print head during one said printing operation causing transfer of ink from a first region of first length of the ribbon;

rewind means operative during intervals between successive ones of said printing operations to feed the ribbon in a second direction opposite to said first direction by an extent of second length related to said first length; and operation of the print head during a second printing operation succeeding said one printing operation causing further transfer of ink from said first region.

2. Thermal printing apparatus as claimed in claim 1 including means responsive to feeding of the ribbon in said first and second directions to generate electrical signals; and said control means being operative in response to said electrical signals to control the rewind means to feed the ribbon in said second direction by the extent of second length.

3. Thermal printing apparatus as claimed in claim 2 wherein the ribbon supply comprises ribbon wound upon a supply spool and including an encoder disc mounted in rotate with said supply spool and a sensor operative in response to rotation of the encoder disc to generate the electrical signals indicative of the amount of rotation of the supply spool.

4. Thermal printing apparatus as claimed in claim 3 including register means operative in response to the electrical signals generated by rotation of the supply spool due to feeding of the ribbon to register a count value related to the length of the ribbon fed in the printing operation.

5. Thermal printing apparatus as claimed in claim 4 including means responsive to an accumulation of the count value from a succession of printing operations to generate an end of ribbon signal when the accumulated count value reaches a predetermined value.

6. A franking machine operable to print franking impressions on mail items including accounting means operative to maintain a record of printing and franking impressions and including thermal printing apparatus as claimed in claim 1 operable to print franking impressions.

7. A method of printing using a thermal print head selectively operable to transfer ink from a thermal transfer inked ribbon to the surface of an item in which the ribbon is made available a plurality of times for ink transfer including the steps of feeding a first item together with the inked ribbon past the print head with the first item in ink transfer relationship with the ribbon during which feeding a first length of ribbon is fed in a first direction past the print head;

selectively operating the print head to transfer ink from the first length of ribbon to the surface of the item to form a print impression on said first item;

releasing the first item from engagement with the ribbon;

feeding the ribbon in a second direction opposite to said first direction by an amount related to said first length; feeding a second item together with the inked ribbon past the print head with the second item in ink transfer relationship with the ribbon and selectively operating the print head to effect further transfer of ink from at least a part of said first length of ribbon to the second item.

8. A method as claimed in claim 7 wherein the ribbon is wound upon and withdrawn from a spool including the steps:

of sensing rotation of the spool during feeding of the ribbon in said first direction to generate a first indication when the first length has been fed;

calculating a proportion of said first indication;

sensing rotation of the spool during feeding of the ribbon in the second direction to generate a second indication; and terminating feeding of the ribbon in the second direction when the second indication is equal to said proportion of the first indication.

9. As method as claimed in claim 8 including the steps of accumulating the first indications and generating an end of ribbon signal in response to accumulation of said first indications reaching a predetermined value.

10. A method of printing using a thermal print head selectively operable to transfer ink from a thermal transfer inked ribbon to the surface of items, the ribbon being made available a plurality of times for ink transfer, including successively performing a group of steps comprising the steps of feeding a first length of the inked ribbon in a first direction;

feeding an item past the print head;

feeding a second length of the inked ribbon in a second direction opposite to said first direction in ink transfer relationship with said item during the feeding of said item past the print head, the first and second lengths of said ribbon being of predetermined relationship so that the second length of ribbon in one group of steps includes a part of the second length in a preceding group of steps;

selectively operating the print head to transfer ink from the second length of the ribbon including transfer of ink from said part of the second length in a preceding group of steps to said item to form a print impression on said item; and releasing said item from engagement with the ribbon after forming the print impression thereon.

11. A method as claimed in claim 10 wherein the ribbon is wound upon and withdrawn from a spool including in each group of steps the steps of:

sensing rotation of the spool during feeding of the ribbon in said second direction to generate a second indication when the second length has been fed;

calculating a proportion of said second indication;

sensing rotation of the spool during feeding of the ribbon in the first direction to generate a first indication; and terminating feeding of the ribbon in the first direction when the first indication is equal to said proportion of the second indication.

12. A method as claimed in claim 11 including the steps of accumulating the second indications and generating an end of ribbon signal in response to accumulation of said second indications reaching a predetermined value.

13. A thermal printing device including:

a thermal print head means to feed an item upon which printing is to be effected past the print head in a first direction;

first ribbon feed means to feed a thermal transfer inked ribbon in said first direction between the print head and the item and in ink transfer relationship with the item during passage of the item past the print head;

print control means operable in a printing operation during feeding of the item past the print head to selectively operate the print head to transfer ink from a region of the ribbon to form a print impression on the item;

second ribbon feed means operable to feed the ribbon in a second direction opposite to said first direction;

sensing means responsive to feeding of the ribbon in the first direction to generate first signals representing an extent to which the ribbon is fed in the first direction and responsive to feeding of the ribbon in the second direction to generate second signals representing an extent to which the ribbon is fed in the second direction;

control means responsive to said first signals and operative after completion of formation of the print impression to operate the second ribbon feed means to feed the ribbon in said second direction until said second signals have a predetermined relationship to said first signals;

said first ribbon feed means being effective to feed said region of said ribbon past the print head for ink transfer to a subsequent item in a subsequent printing operation.

14. A franking machine including a thermal print head operable by print signals;

means to guide a thermal transfer inked ribbon past the thermal print head;

feeding means to feed a mail item in a first direction past the thermal print head with the thermal transfer ribbon interposed between the mail item and the print head;

pressure means actuable to press the mail item toward the print head into ink transfer relationship with the ribbon, said engagement being effective to feed the ribbon with the mail item in the first direction;

rewind means operable to feed the ribbon in a second direction opposite to said first direction;

control means operable to actuate the pressure means and to generate print signals to operate the print head to cause transfer of ink from the ribbon to the mail item to form a franking impression on the mail item during feeding of the mail item together with a first length of ribbon past the print head;

said control means being operative after completion of formation of the franking impression to terminate actuation of the pressure means to release the ribbon;

sensor means operative to generate first signals representing a first length of ribbon fed with the mail item in said first direction and second signals representing a second length of ribbon fed in said second direction by said rewind means; and said control means being responsive to said first and second signals and operative to control operation of the rewind means to feed the ribbon in the second direction until the second signals have a predetermined relationship with said first signals.

* * * * *